United States Patent Office 3,265,551
Patented August 9, 1966

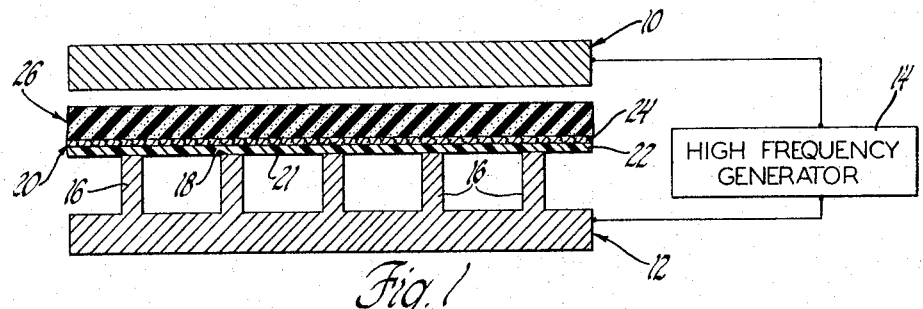
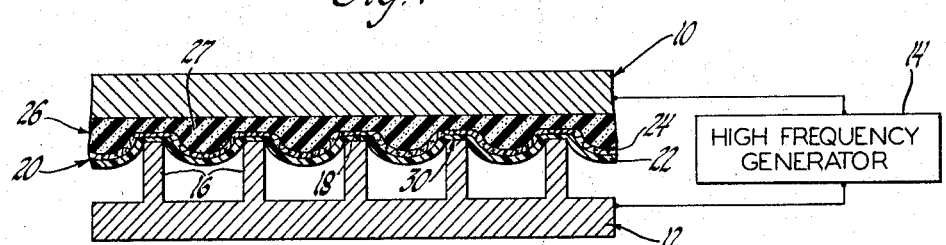
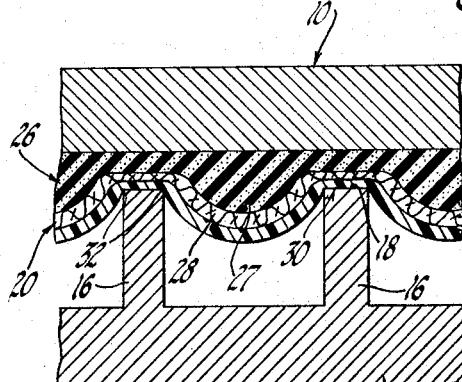
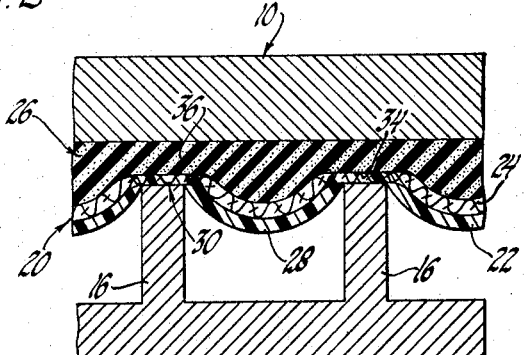
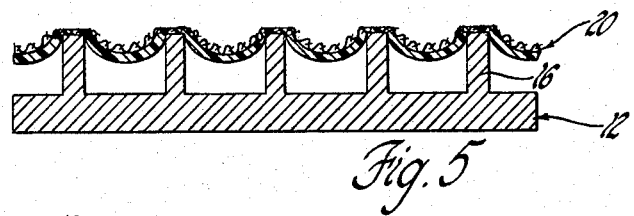
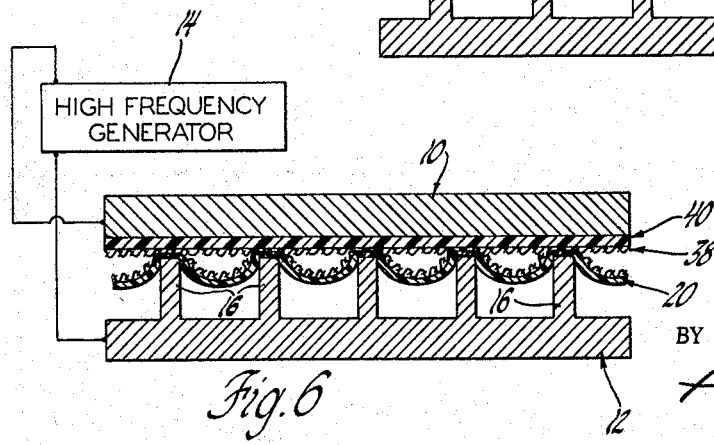

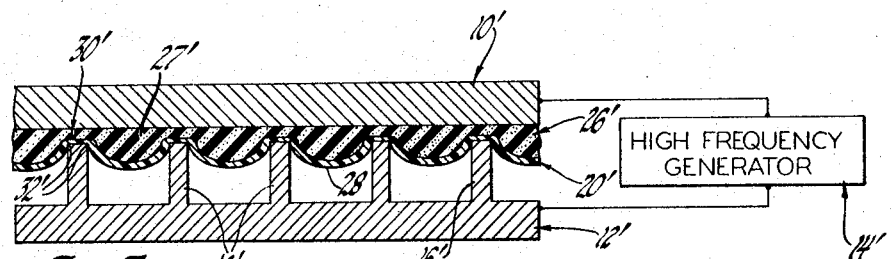
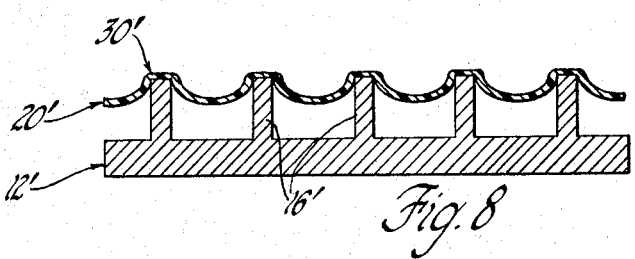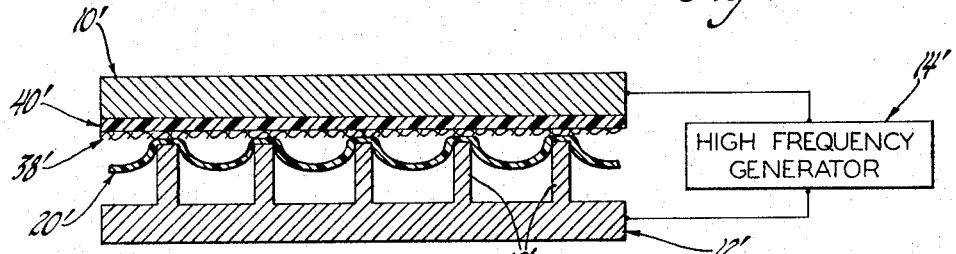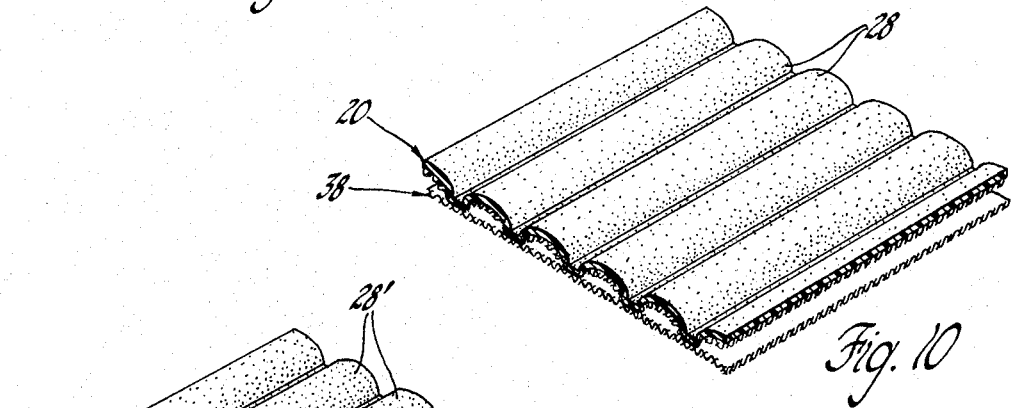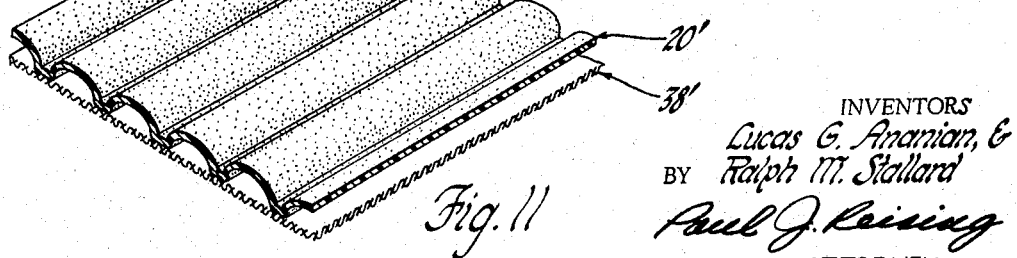

3,265,551
DIELECTRIC EMBOSSING METHOD FOR MAKING PIPED MATERIALS
Lucas G. Ananian, Detroit, and Ralph M. Stallard, Rochester, Mich., assignors to General Motors Corporation, Detroit, Mich., a corporation of Delaware
Filed Apr. 23, 1962, Ser. No. 189,582
4 Claims. (Cl. 156—219)

This invention concerns a dielectric embossing process for providing hollow risers in a decorative article.

In the manufacture of decorative trim assemblies and the like, the common practice has been to provide embossed trim lines in the cover sheet or trim material by a dielectric heating operation. Usually, the trim assembly comprises a trim material positioned on a cotton padding filler impregnated with a heat fusible plastic and supported by a fiber board or fabric backing sheet. When this assembly is dielectrically embossed, the trim material is bonded to the base sheet through the filler; the plastic in the latter having been melted and cured along the embossed lines, thus serving as the bonding adhesive.

In instances where the trim lines are spaced relatively close together and in parallel relationship, a riser or piped section is formed between the lines, which in cross section, consists of an arcuate section beginning and terminating at adjacent embossed lines with the trim material therebetween being held in an elevated position by the filler material. A plurality of such embossed lines provided in the trim assembly, results in risers that produce an attractive decoration which gives the observer the impression of a sewn assembly. This method of forming risers, although finding commercial acceptance, has proved to be costly due to the need for a specially prepared filler material which must have permeable properties to enable the adhesive to penetrate therethrough and the attendant need for the adhesive having electrical properties which respond to an alternating current of radio frequency.

Accordingly, a principal object of this invention is to provide a simple and inexpensive process for dielectrically embossing piped or riser sections in a trim material without requiring any filler material.

Another object of this invention is to provide hollow piped or riser sections in a trim material which give the feel and physical appearance of being supported in an elevated position by a filler material.

The above and other objects are accomplished with a method, which in its preferred form, includes the placing of a sheet of trim material on a plurality of spaced elongated blades of a dielectric heating press. The trim material is then covered with a sheet of non-polar yieldable material after which the press is closed to apply pressure and thereby compress the yieldable sheet into the area between the blades to form risers. Thereafter, an alternating current of radio frequency is applied to the portions of the trim sheet contacting the blades so as to soften the material and remove any tension in the sheet. The applied pressure is then removed to permit the yieldable material to return to its normal form and leave hollow risers in the trim sheet. This is followed by removing the yieldable sheet from the press without disturbing the trim sheet, and substituting a backing sheet which is then dielectrically bonded to the deformed trim sheet along the trim lines created by the die blades.

A more complete understanding of the subject process can be derived from the following description taken in conjunction with the drawings in which:

FIGURE 1 is a schematic view taken on a vertical section of a dielectric heating press showing a sheet of trim material and a sheet of resilient material positioned prior to embossment.

FIGURE 2 is a view similar to FIGURE 1, showing the several parts preparatory to the embossing operation.

FIGURE 3 is an enlarged view of a portion of the several parts shown in FIGURE 2 in the area between the die blades.

FIGURE 4 shows the parts of FIGURE 3 after the heating cycle.

FIGURE 5 is a view of the lower electrode with the trim material positioned on the blades after the yieldable sheet is removed.

FIGURE 6 is a view showing a backing sheet being bonded to the deformed trim material of FIGURE 5.

FIGURES 7, 8, and 9 are views similar to FIGURES 2, 5, and 6 respectively, except for showing a sheet of unsupported trim material being embossed.

FIGURE 10 is an isometric view illustrating the final article derived from this process when using a supported trim sheet.

FIGURE 11 is a view similar to FIGURE 10 but shows the final article having an unsupported trim sheet.

Referring now to FIGURE 1 of the drawings, a dielectric heating press is shown, comprising in general an upper electrode 10 and a lower electrode 12, both of which are connected in series with a high frequency alternating current generator 14. The upper electrode is movable through operating means (not shown) towards and away from the lower electrode while the generator is capable of impressing an alternating current at a frequency between 1 and 100 megacycles between the electrodes. This type of heating press is well known in the art and therefore further comment with respect thereto is not believed necessary.

The lower electrode 12 includes a plurality of upstanding and spaced die blades 16, each of which terminates with a flat surface 18 which lies in a common horizontal plane with the other terminal surfaces. It should be understood that the die blades are shown in cross section and that when viewed in elevation they are of substantial length and of a width which is dictated by the visual effect one desires to have the trim lines make in the trim material. In the preferred form of this invention, the die blades used were approximately 0.0625" in width and spaced approximately 0.45" apart; however, it is emphasized that the width of the die blades and the spacing therebetween may vary, depending upon the thickness and type of material being embossed.

To practice the invention, a sheet of supported trim material generally indicated by numeral 20 is positioned in the press on the blade surfaces 18 with the finished or tooled surface 21 face down, as shown in FIGURE 1. The lower portion 22 of the trim material may be made from plastic such as vinylchloride, vinylidene chloride, and any other similar synthetic which can be formed into flexible sheets with finishes resembling leather. The portion 22 is backed by a fabric 24 formed of cotton, wool, rayon, etc. which is usually bonded to the plastic 22 by the manufacturer of the trim material and, when such is the case, is frequently referred to as "supported" trim sheet. The thermoplastic portion 22 of the trim sheet has a high dielectric constant which is defined as the ability of the dipole molecule in the material to rotate when subjected to an electric field. As is well known to those familiar with dielectric heating, the latter is a selective heating process that develops heat internally in an electrical insulating material by reversing the charges on the electrodes at a high frequency. As the charges reverse, the dipole molecules rotate to keep the positive poles toward the negative electrode and the negative poles toward the positive electrode. This rotation of molecules produces friction which results in heat for melting the thermoplastic.

With the supported trim sheet 20 being positioned as shown in FIGURE 1, it is then covered with a coextensive sheet 26 of yieldable material such as rubber silicone which has a low dielectric constant that prevents any heat from being generated therein when subjected to an alternating current of radio frequency. Because of its particularly suitable electrical and physical properties, silicone rubber is by far the preferred material from which the sheet 26 is made. Of course, any other yieldable material may be used so long as its electrical properties are such as found in silicone rubber and it has excellent recovery and mechanical strength. It has been found that when using a trim sheet 20 having a thickness of approximately 0.030", the sheet of silicone rubber can have a thickness of approximately 0.156" which has proved to give good results in practicing the invention.

With the various elements being positioned as shown in FIGURE 1, the upper electrode is then moved downwardly towards the lower electrode so as to apply a pressure between 500 and 1,000 p.s.i. to the rubber sheet 26 and the supported trim material 20. As seen in FIGURE 2, this causes a portion 27 of the yieldable sheet 26 to be pressed between the blades 16 so as to deform the trim material 20 into an arcuate riser section as indicated by the numeral 28. Simultaneously, the portion 30 of the trim sheet 20 which is contacted by each blade surface 18 is stretched and placed in tension so as to elongate the spacing between the threads of the support fabric 24. Thereafter, an alternating current is impressed across the upper and lower electrodes 10 and 12 respectively; the voltage being between 1,200 and 4,000 volts and the frequency between 1 and 100 megacycles. Referring to FIGURE 3, during the time that the voltage is being applied, it should be noted that because an electric field tends to concentrate at sharp corners or edges, the field will concentrate particularly at the corners 32 of each die blade 16 with sufficient field existing between the blade surface 18 and the upper electrode 10 to cause internal heating in the thermoplastic 22 in the area bounded by corners 32. The electric field is generated between the electrodes for a period from two to six seconds, during which time the thermoplastic in the stretched portion 30 of the trim sheet softens and flows between the threads of the fabric 24 to combine therewith as shown in FIGURE 4. Thus, the heating cycle relieves the tension in the plastic and fixes the elongated spacing between the threads to permanently set the trim sheet in the deformed shape. As alluded to hereinbefore, the yieldable sheet 26 of silicone rubber is non-polar; consequently, no heat is generated therein so that the surface 34 of the rubber in contact with the heated portion of the trim sheet 20 is at a temperature substantially lower than that of the thermoplastic during the heating cycle. Hence, the cool surface 34 of the yieldable sheet serves to quench the plastic as it penetrates the threads of the fabric 24 to prevent any sticking between the sheets. Additionally, the portion 36 of the rubber compressed between the blade surface 18 and the upper electrode 10 spaces the two and acts as an insulator to preclude arcing therebetween.

After the heat cycle is completed, the upper electrode 10 is then raised to relieve the pressure on the composite sheets and permit the yieldable sheet 26 to return to its normal form as indicated in FIGURE 1. The sheet 26 is then removed from the deformed trim sheet without disturbing the latter which remains on the die blades 16 as shown in FIGURE 5. A sheet of backing material 38 is then positioned onto the undisturbed trim sheet 20 and is covered with a rigid sheet of insulating material 40 followed by a closing of the press as indicated in FIGURE 6. The backing sheet 38 can be made from cotton, wool, rayon, etc., which may be impregnated with a fusible thermoplastic resin. The insulating sheet 40 is made from a stiff material which has electrical properties similar to those of the silicone rubber to prevent arcing between the upper and lower electrodes 10 and 12 respectively when the press is closed and a voltage is impressed between the two. After closing the press, a pressure between 500 and 1,000 p.s.i. is applied once again, and an alternating current of radio frequency is impressed between the electrodes to heat the fusible material in the sheets 20 and 38 to bond the two in the area bounded by the blade edges 32. As in the former heating cycle, the current is generated between electrodes for a time period between two and six seconds so as to cause the trim sheet 20 to adhere to the backing sheet 38 at the embossed trim lines 30, thus forming the product shown in FIGURE 10. The trim assembly, composed of the trim and backing sheet, can then be removed from the press for subsequent use as a decorative article having a plurality of hollow risers 28. It should be noted that the backing sheet 38 prevents the hollow risers from stretching out of shape and also serves as a means for securing the risers to a trim panel, seat back, seat cushion, or any other article requiring a decorative cover.

FIGURES 7 through 9 show the same process used for forming hollow risers in a trim sheet 20' that is unsupported by any fabric as was the case with the trim sheet 20. In this instance, when the press is closed, some of the yieldable sheet 26' is pressed between the die blades 16' and the portions 30' of the trim sheet 20' are stretched and placed in tension as with the supported trim sheet. When a voltage is impressed between the electrodes 10' and 12', the thermoplastic in the area bounded by the blade corners 32' is softened and a portion thereof flows toward the blade corners. As aforementioned, since the electric field created by the generator 14' concentrates at sharp corners, the field is quite intense in this area and consequently internal heating of the trim sheet occurs in the region adjacent the corners and slightly below. This permits the depressed portion 27' of the sheet 26' located between the die blades, to elongate this portion of the trim sheet as the portion 30' is heated. FIGURE 8 shows the trim sheet 20' after being heated with the yieldable sheet 26' having been removed, and it should be noted that the thickness of the trim material is uniform in the deformed portions even though it had been stretched and elongated as described above. This uniformity is achieved because of the softened plastic at the portion 30' being squeezed outward from under the blade surface 18' to make up for the deficiency in plastic caused by the stretching.

After removing the yieldable sheet 26' from the press, a backing sheet 38' and rigid insulating plate 40' are positioned on the deformed trim sheet 20', the press is closed as shown in FIGURE 9, and the voltage is applied so as to join the trim sheet and backing sheet to produce the finished article shown in FIGURE 11.

Various changes and modifications can be made in the above-described process without departing from the spirit of the invention. For example, rather than forming elongated pipe-like risers, the process can be used to make round, square, rectangular, or risers of any other shape without requiring filler material for elevating or supporting that portion of the trim material located between the embossed lines. As would be apparent to those skilled in the art, this could be accomplished simply by forming the die blades in the configuration desired to be embossed in the trim material and thereafter practicing the invention as described above. Therefore, it should be understood that such changes and modifications are contemplated by the inventors and they do not intend to be limited except by the scope of the appended claims.

We claim:

1. A method of making a decorative article with a dielectric heating press in which one of the electrodes includes a plurality of spaced elongated blades comprising the steps of positioning a sheet of thermoplastic material on said blades, placing a coextensive sheet of non-polar yieldable material onto the sheet of thermoplastic material, applying pressure to the composite sheets so as to compress the yieldable material into the area between the blades and simultaneously stretch the portion of the sheet in contact with the blade, applying high frequency electrical energy to the portion of the thermoplastic sheet contacting said blade to soften the material and remove the tension in the stretched portion of said sheet, removing the applied pressure from the composite sheets to permit the non-polar material to return to its normal form, removing the non-polar sheet from the heating press, positioning a backing sheet over the sheet of thermoplastic material, and dielectrically bonding the backing and thermoplastic sheet together at the said portion of the sheets contacting the blades to form hollow risers.

2. A method of making a decorative article with a dielectric heating press in which one of the electrodes includes a plurality of spaced blades, comprising the steps of positioning a sheet of thermoplastic material on said blades, placing a non-polar resilient material onto the sheet of thermoplastic material, applying pressure to the composite sheets so as to compress the resilient material into the area between the blades and simultaneously stretch the portion of the thermoplastic sheet in contact with the blade, dielectrically heating the portion of the thermoplastic sheet contacting said blade to soften the material and remove the tension in the stretched portion of said sheet, removing the applied pressure from the composite sheets to permit the non-polar material to return to its normal form, removing the non-polar sheet from the heating press, placing a backing sheet on the sheet of thermoplastic material and dielectrically bonding the backing and thermoplastic sheet together at the said portion of the sheets contacting the blades to form hollow risers.

3. The method of claim 2 wherein said sheet of non-polar resilient material is made of silicone rubber.

4. The method of claim 2 wherein the sheet of thermoplastic material is backed by a fabric.

References Cited by the Examiner
UNITED STATES PATENTS

| | | | |
|---|---|---|---|
| 2,322,226 | 6/1943 | Cunnington | 156—219 |
| 2,400,518 | 5/1946 | Kreber et al. | 264—322 |
| 2,536,316 | 2/1951 | Schwarz et al. | 264—320 |
| 2,946,713 | 7/1960 | Dusina et al. | 156—219 |
| 3,053,960 | 9/1962 | Spieles | 156—273 |

EARL M. BERGERT, *Primary Examiner.*

H. L. GATEWOOD, D. J. DRUMMOND,
*Assistant Examiners.*